United States Patent [19]

Teller

[11] 3,957,464
[45] May 18, 1976

[54] PROCESS FOR REMOVING PARTICULATES FROM A GAS

[75] Inventor: Aaron Joseph Teller, Westboro, Mass.

[73] Assignee: Teller Environmental Systems, Inc., Worcester, Mass.

[22] Filed: Apr. 25, 1974

[21] Appl. No.: 463,652

[52] U.S. Cl. ........................................ 55/68; 55/73; 55/85; 55/89; 55/94
[51] Int. Cl.² ........................................ B01D 47/12
[58] Field of Search ............. 55/89, 90, 93, 94, 258, 55/259, 233, 68, 73, 85

[56] References Cited
UNITED STATES PATENTS

| | | | |
|---|---|---|---|
| 2,585,659 | 2/1952 | Kilpatrick | 55/89 X |
| 3,073,092 | 1/1963 | Ancrum et al. | 55/94 X |
| 3,237,381 | 3/1966 | Hvostoff et al. | 55/89 |
| 3,324,630 | 6/1967 | Teller et al. | 55/90 |
| 3,505,788 | 4/1970 | Teller et al. | 55/84 X |
| 3,802,158 | 4/1974 | Ohle | 55/259 X |

*Primary Examiner*—John Adee
*Attorney, Agent, or Firm*—Thompson, Birch, Gauthier & Samuels

[57] ABSTRACT

An essentially adiabatic process for the crossflow scrubbing of particulate material from a gas is disclosed in which the scrubbing liquid is recirculated without cooling. By a combination of a minimum gas temperature of about 150°F., saturation conditions, and a certain amount of turbulence, it has been found possible to achieve particulate nucleation prior to passage of the gas through the scrubber units which, in turn, makes it possible to recycle the scrubbing liquid while maintaining it at a substantially constant temperature.

16 Claims, 2 Drawing Figures

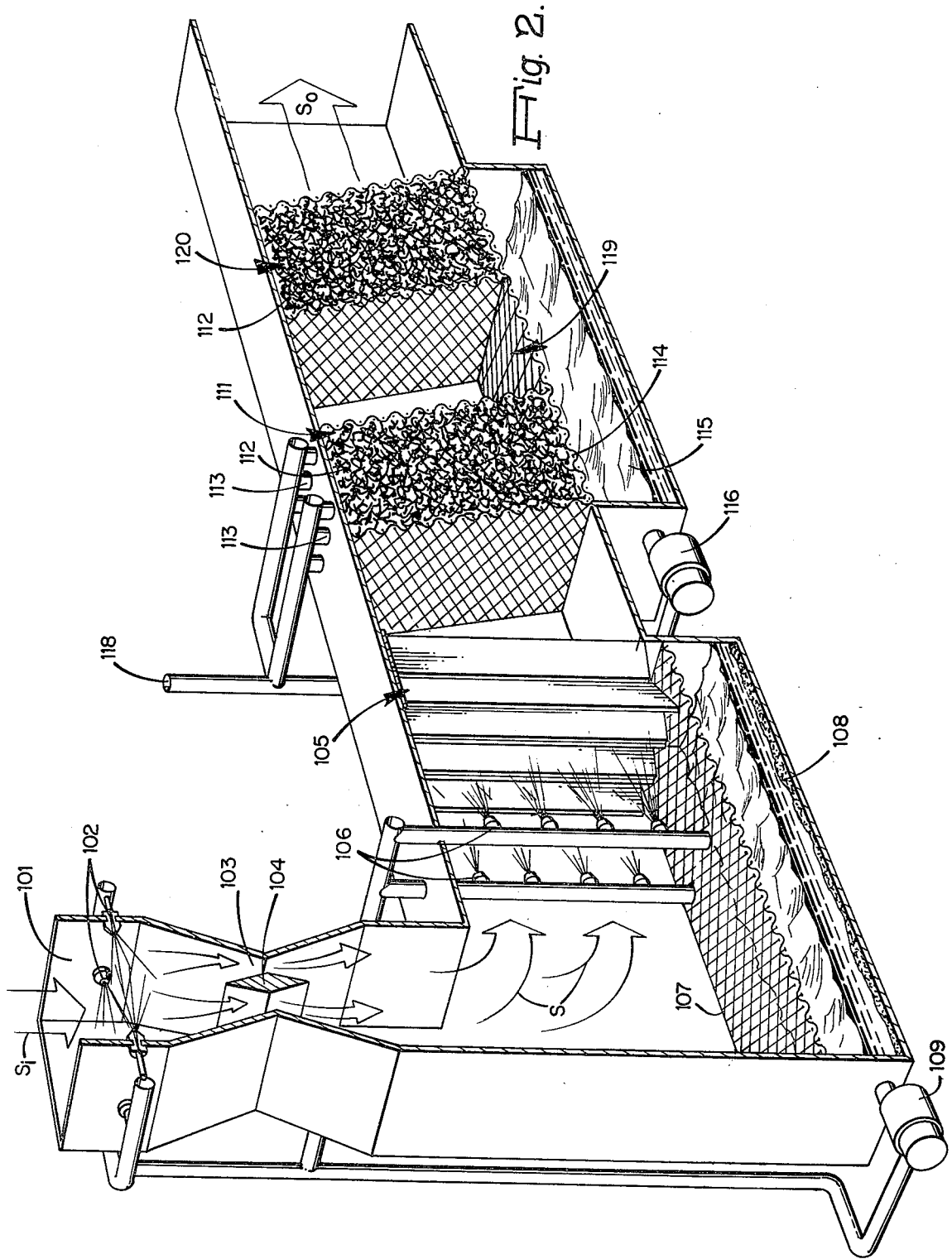

PROCESS FOR REMOVING PARTICULATES FROM A GAS

BACKGROUND OF THE INVENTION

This invention relates to a process for the scrubbing of particulate material from a gas such as an industrial effluent gas. More specifically, it relates to an improvement in earlier U.S. Pat. No. 3,324,630 entitled "Crossflow Scrubbing Process", and that disclosure is incorporated herein by reference. However, the present invention is not limited in application to the scrubber as described in the aforementioned patent. The process essentially comprises the crossflow application of a scrubbing liquid to a particulate-containing gas stream flowing in an essentially horizontal path through a chamber filled with suitable packing units.

Historically, particles have been removed from gas stream either by expenditure of large quantities of energy, such as in electrostatic precipitators, impinging devices, etc., or by enlarging the cross section of the ducts in which the gases flow to thereby reduce their velocity and achieve more effective settling. Both procedures are characterized by high cost of operation and/or high capital investments.

While some of the prior art processes have relied in whole or in part on the mechanism of "inerital impaction" for achieving the separation of particles from a gas stream, a number of difficulties found inherent in this process create problems of efficiency or cost. The inertial impaction method of particle removal is based on the concept that at a given velocity a suspended particle, by virtue of its higher density compared with the carrier gas, has a greater inertia. Therefore, if an obstruction is present the gas will be diverted around the obstruction whereas the particle, as the result of its greater inertia, will impinge or impact upon the obstruction. This generally results in the separation of the particles from the gas stream by adherence to the obstruction or by the particles dropping out of the gas stream after impact under the force of gravity.

Inertial impaction methods using packed towers for removal of particles from the gas stream have been highly unsuccessful for a number of reasons. For example, the deposition of the particles on the packing causes plugging and inordinately large quantities of flushing liquids are necessary for proper irrigation to remove particles from the packing. Moreover, a high pressure drop is experienced when the gas stream is forced through the packing. Consequently, the excessive size of equipment required, the low efficiency of the process, and the resultant high cost make this method commercially impractical. A maximum of only 60% efficiency was achieved with a Berl Saddle packed column and even that only in a very narrow range of operation [Massey, Chem. Eng. 66(14), 143(1959)].

In the aforementioned U.S. Pat. No. 3,324,630, there is a filamentous a novel process for the removal of particulates from gas streams which comprises a preliminary step for the removal of larger particles on the order of 10 microns or greater followed by passing the gas stream in an essentially horizontal path through one or a plurality of chambers in series packed with a packing material having certain physical characteristics while simultaneously passing a scrubbing liquid in crossflow contact with the gas to achieve particulate nucleation and consequent removal of smaller particles on the order of 0.5–10 microns in size. The preferred packing material is a filamentous packing having little continuous extensive surface and having about 80–85% free volume, and consisting of randomly arranged, interlocked tower packing units, the units being made up of approximately circular, integrally connected filament portions having their axes approximately tangent to a circle at approximately evenly spaced points therearound, the number of such spaced approximately circular portions being from 6–12 and the diameter of such circle being approximately equal to the diameter of one of such approximately circular filament portions plus the diameter of a smaller circle whose circumference is not less than the cross-sectional dimension of the filament portion in the direction of its axis times the number of such filament portions and not greater than the circumference of one of such approximately circular filament portions. This process not only makes it possible to more economically remove smaller particles than any prior art process, but also realizes economies in permitting a more rapid gas flow to be cleaned by a smaller quantity of scrubbing liquid.

A principal feature of the aforementioned process is the discovery that very small particles on the order of about 0.5 microns and smaller can be removed by the process of "nucleation". Nucleation is theorized to consist of two elements, "real" growth by the condensation of moisture on the particles and "effective" growth which is the result of inelastic collisions between wetted particles. This permits very tiny particles to be more effectively removed.

The moisture condensation in the aforementioned process is effected by first increasing the humidity of the dust-laden gas so that it is saturated above the dew point prior to entering the scrubbing unit then using the cooling action of the water or other liquid passing through the scrubbing unit to condense the moisture in the gas on the particles. The increase in humidity is effected by various means such as the introduction of steam, by cooling the gas entering the system, or by direct water spray, etc.

To achieve nucleation and removal of particles on the order of 0.5 microns in accordance with the aforementioned process, it is necessary to employ scrubbing liquid at a temperature of about 40°–80°F. to obtain the requisite cooling action in the scrubbing unit. Because of the high temperature of the gas stream entering the scrubbing unit, generally about 150°F. or higher, the scrubbing liquid is heated by conduction and direct contact with the gas in the process thus requiring cooling, such as in an expensive cooling tower or similar step, before it is suitable for recirculation.

OBJECTS

Accordingly, it is an object of the present invention to provide an improved process and apparatus for the removal of particulates from a gas stream.

Another object of the present invention is to provide a process and apparatus for the removal of particulates from about 0.1–10 microns in size.

It is still further an object of the present invention to provide a wet scrubbing process and apparatus for the removal of very fine particles from a gas stream by means of an essentially adiabatic process which dispenses with the need for a separate cooling operation for the scrubbing liquid.

DESCRIPTION OF THE PREFERRED EMBODIMENT

All of the above objects are economically realized by employing a certain combination of temperature, saturation, and turbulence to promote nucleation of the particles in the gas stream before the particles enter the scrubbing unit. In general, the present invention comprises the following steps:

1. In a preliminary step, the hot particulate-laden gas is treated by conventional means for the removal of particles lager than about 10 microns. Such means are well known in the art and include a cyclone separator, a spray tower, a venturi, an electrostatic precipitator, and a tray column, either alone or in combination. For example, the combination of a cyclone separator for the preliminary removal of dust particles and a crossflow scrubbing apparatus for the removal of very small particles is illustrated in the aforementioned U.S. Pat. No. 3,324,630. This step is optional since the subsequent steps set forth below will remove large as well as relatively small particles; however, if particles larger than about 10 microns are present to any significant degree, the preliminary separation step will be more economical.

2. The hot gas, preferably containing only particles about 10 microns or smaller in size, is next subjected to a water quench immediately prior to or simultaneous with its passage through a venturi (not to be confused with the venturi which may optionally be used in step 1 above). This treatment cools (although maintaining the temperature above 150°F.) and moisturizes the gas to a point approaching saturation conditions and introduces additional turbulence in the gas. As a result of the turbulence and moisturizing, nucleation of particles in the size range of 1-4 microns promoted at this point, and these tend to drop out of the gas stream by action of gravity. Means are provided for removing the particles taken out of the gas stream at this step in the process.

3. The gas, now containing particles below about 1-3 microns in size, is passed through a water-washed baffle system. This further cools (although still maintaining the temperature above 150°F.) and moisturizes the gas to complete saturation and also creates additional turbulence in the gas stream. At this point nucleation is promoted among particles less than about 1 micron in size, and some of these particles will be removed from the gas stream either by action of gravity or by impinging on the baffles and being washed therefrom by the water sprays. Means are again provided for removing from the apparatus particles taken out of the gas stream at this step of the process.

4. On leaving the baffle system, the turbulent, saturated gas is at a temperature above about 150°F. and these conditions have promoted rapid nucleation among particles down to a size of about 0.10 microns or less. At this point, nucleation is generally complete; however, the preponderance of these nucleated particles are still entrained in the gas stream.

5. The gas stream is next passed through one or a plurality of packed scrubber beds in crossflow contact with a scrubbing liquid in the manner described in the aforementioned U.S. Pat. No. 3,324,630. The difference in the present invention is that hot scrubbing liquid, that is liquid at a temperature which is approximately the same as the temperature of the gas, may be used to scrub the already-nucleated particles from the gas stream and from the packing on which they impinge.

6. The gas stream is recovered from the scrubber unit essentially free of particulate matter larger than about 0.10 microns. At this point the gas may be exhausted to the atmosphere without significant particulate pollution, or it may be subjected to further treatment such as cooling, removal of water vapor, and/or removal and recovery of contaminant gases.

7. Optionally at this point and before discharge to the atmosphere, the hot, moist gas stream may be passed through a drainage zone followed by a demister. This step is a fairly simple and economical means for removing entrained droplets of liquid from the gas stream before exhausting it to the atmosphere. First, the gas stream, from which particulates have been removed, is passed through an open drainage zone which permits larger entrained droplets of liquid to fall from the stream by action of gravity. Smaller entrained droplets of liquid are removed by subsequently passing the gas stream cross-wise through a demister which is preferably a unit packed with the same packing material as the scrubber.

Although the nucleation mechanism is not fully understood, it is believed to involve the condensation of moisture on the smaller particles and their subsequent collision with and binding to other such particles thereby increasing the effective size of the particles. The nulceation mechanism appears to be linked to the electrostatic surface charge on particles, and it is believed that a surface charge of at least $1 \times 10^{13}$ eu/cm$^2$ is required for nucleation to occur under the process conditions described above. The surface charge on a particle is a function of its surface/mass ratio and of the physical properties of the material. The effectiveness of nucleation, on the other hand is a function of two variables, temperature and turbulence. Thus, it has been found that a higher gas temperature will compensate, in part, for a lesser degree of turbulence in the gas stream. For example, in many instances at operating temperatures above 160°F. it has been found possible to eliminate the baffle system and still achieve nucleation prior to the gas steam reaching the scrubber unit by relying solely on the venturi and accompanying water quencn. At operating temperatues of about 190° up to 212°F., the uppermost limit, as the boiling point of water at normal atmospheric pressure, it is possible to dispense with the venturi and water quench and rely solely on the water-washed baffle system. In some instances under these extreme conditions it may be possible to dispense with both the venturi and the baffle system and rely on a set of water jets to humidify the gas. For a given set of process conditions, the temperature of the gas stream and the degree of turbulence may be varied by experimentation to optimize results. In general, the degree of turbulence artificially induced in the gas stream in accordance with this invention should be the equivalent of a Reynolds number of at least 3000.

BRIEF DESCRIPTION OF DRAWINGS

FIG. 2 is a partially-cutaway perspective view which more clearly illustrates the internal structure of the apparatus shown schematically in FIG. 1.

DESCRIPTION OF PREFERRED EMBODIMENT

Figure 1:
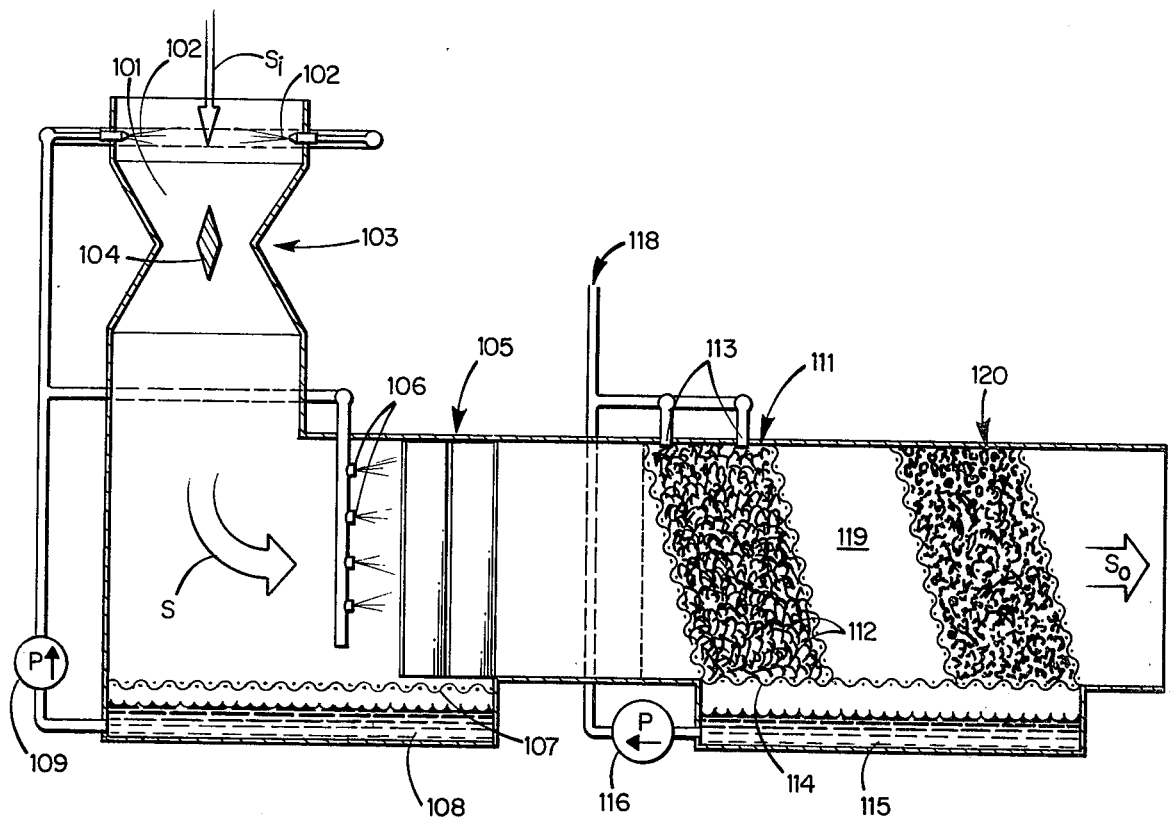
FIG. 1 is a schematic view of apparatus for carrying out the adiabatic nucleation process described in steps 2-6 above.

Referring now to FIGS. 1 and 2, the hot inlet gas stream $S_i$ at a temperature of about 350°F. and a dew point of about 140°F., having already been treated for preliminary particle removal (as, for example, in optional step 1 above), is directed at a velocity of about 50 fps. into a venturi 101. The gas is subjected to a water quench 102 prior to reaching the venturi throat 103. A plug 104 having an essentially diamond-shaped cross-section may be inserted in the venturi throat and has been found to improve the efficiency of recovery. In particular, the use of a venturi with a diamond-shaped plug has been found to facilitate the removal of intermediate-sized particles of about 1–4 microns at this stage of the process. The removal of particles in the size range of 1–4 microns at this stage is believed to be the result of beginning nucleation, and such particles drop out of the gas stream either by action of gravity or by impinging on the diamond-shaped plug and being washed therefrom by the water spray. These particles are separated from the excess liquid introduced via the spray quench by suitable means such as filter screen 107 located under the venturi from which they are continuously or periodically removed. The excess liquid drains through filter screen 107 to collection chamber 108 for recirculation as hereinafter described.

The turbulent gas stream S, cooled but still at a temperature above 150°F. and moisturized to near saturation is next channeled through a set of baffles 105 which are continuously washed by a set of water jets 106. At this point nucleation occurs among particles below about 1 micron in size, and some of these are removed from the gas stream at this stage either by action of gravity or by impinging on the baffles and being washed therefrom by the water sprays. The wash water is drained to the bottom of the apparatus through filter screen 107 for effecting the separation of particles and liquid and into collection chamber 108. A pump 109 is used to recirculate the wash water, and the particles of filter screen 107 are continuously or periodically removed therefrom by suitable means.

Emerging from the baffle system, the turbulent gas is saturated with water vapor at a temperature of at least about 150°F. Nucleation of the particles is complete by the time the gas stream reaches the scrubber. The gas together with the entrained, nucleated particles is then passed in an essentially horizontal path through scrubber bed 111 packed with a suitable packing material 112 where it is brought into crossflow contact with a scrubbing liquid, such as water, which is continuously sprayed into the scrubber bed by water jets 113. Although FIGS. 1 and 2 show a scrubber having a single scrubber bed, the number of beds and the size of the beds is not critical and may be varied to suit individual process requirements. For example, in the case of a gas stream containing both fluoride and sulfur oxide contaminants, two scrubber beds in series may be used to individually remove the contaminants in the manner hereinafter described. The bed shown in FIGS. 1 and 2 is inclined at an angle of about 15° from the vertical in the direction in which the gas is moving. Such a construction is not critical but helps to prevent "channeling" of the gas through the packing and thus insures thorough crossflow contact. The scrubbing liquid together with particulates is drained to the bottom of the scrubbing bed through a support screen 114 which is of such a mesh size that the packing material 112 is supported while the particulates pass through and into a collection and settling chamber 115. Pump 116 is used to recirculate the scrubbing liquid, and particulates are periodically or continuously removed from the bottom of chamber 115. In some applications, a single collection chamber may replace 108 and 115 and this single chamber may be served by one pump.

Instead of water, the scrubbing liquid may be brine solution such as a mildly alkaline solution or slurry of about 0.05–10 wt.-% aqueous solution of sodium hydroxide or sodium carbonate or a lime slurry. The alkaline solutions and slurries are especially useful in reducing the concentration of acid gases such as hydrogen halides and sulfur oxide contaminants to below the allowable limits for release into the atmosphere. By employing two scrubber beds in series, the fist washed with a mild alkaline solution such that the pH is reduced below about 6 as acid is absorbed and the second washed with a stronger alkaline solution such that the final pH is about 8, hydrogen fluoride may be preferentially removed in the first scrubber bed and sulfur dioxide in the second. Such a process is described in greater detail in co-pending U.S. patent application Ser. No. 243,147 filed Apr. 12, 1972 now abandoned and Ser. No. 463,653 entitled ABATEMENT AND SELECTIVE RECOVERY OF ACID GAS EMISSIONS filed on even date herewith by the same inventor and those disclosures are incorporated herein by reference. Because some of the scrubbing liquid is invariably lost by vaporization or entrainment in the scrubber units, it is usually necessary to supplement the liquid recirculation system with a feed of make-up scrubbing liquid 118. The treated outlet gas stream $S_o$ leaving the apparatus is saturated at a temperature of about 150°F. or higher and is substantially free of particulate matter larger than about 0.10 microns.

Advantageously, after leaving the scrubbing bed 111 the gas steam is passed through an open drainage zone 119 to allow drippage of entrained liquid droplets followed by a demisting chamber 120. The demisting chamber is packed with any suitable packing material, preferably the same material 112 used to pack the scrubber, and acts to reduce the liquid content of the gas stream to minimize fogging at the outlet point.

It is often convenient, as shown in FIGS. 1 and 2, to connect the recirculated water for the baffle wash system 106 and the venturi water quench 102. In place of water, both the venturi quench and the baffle wash may employ a mild alkaline solution as suggested above for the scrubber liquid to reduce acid gas contaminants.

The following examples will serve to better illustrate the present invention:

EXAMPLE 1

A scrubber system set up according to the process of the present invention as described above exhibited the process characteristics shown in Table 1 below.

TABLE 1

| | Gas Conditions | |
|---|---|---|
| | Inlet | Outlet |
| Gas Flow (acfm) | 130,000 | 109,600 |
| Temp. (°F.) | 310 | 167.5 |
| Dew Point (°F.) | 167 | 167.5 |
| Conc. $SO_x$[1] (ppm.) | 50–150 | 10–30 |
| Conc. Particulates | 0.1–0.4 | .03–.04 |

TABLE 1-continued

| | | |
|---|---|---|
| (gr./scf.) | | |
| TRS | 10–80 | 3–5 |
| (ppm.) | | |

[1]$SO_x$ is used to denote mixed sulfur oxides, predominantly $SO_2$.

Scrubbing Liquid[2]

| | Inlet | Outlet |
|---|---|---|
| Liquid Flow (gpm.) | 3760 | 3713 |
| Temp. (°F.) | 167 | 167 |

[2]Scrubbing Liquid comprised 3 parts volume of 30% NaOH/44 parts water.
Venturi quench water — 1300 gpm. at 167°F.
Baffle wash water — 400 gpm.
Make-up scrubbing liquid — 47 gpm.
acfm — actual cubic feet per minute
ppm. — parts per million by volume
gr./scf. — grains per standard cubic foot
gpm. — gallons per minute
TRS — total reduced sulfur The inlet gas stream $S_i$ arrives at the entrance to the scrubber unit at an actual flow rate of 130,000 cfm. at 310°F. and having a dew point of 167°F. The gas stream contains particulates having a size of 0.2–1.1 microns in a concentration of about 0.1–0.4 gr./scf. and sulfur oxides in a concentration of about 50–150 ppm. Total reduced sulfur (TRS) is in the range of 10–80 ppm.

The gas is first treated according to the present invention by passing it through a venturi equipped with water spray nozzles 102 to simultaneously cool and humidify the gas. Next the gas is passed through a water-washed baffle system 105, 106 to create additional turbulence and to insure the process conditions necessary to promote nucleation. Finally, the gas stream containing nucleated particles is passed through the scrubber 111 in crossflow contact with about a 2% aqueous solution of sodium hydroxide. The temperature of the scrubber liquid, once equilibration and steady-state conditions have been reached, is the dew point of the gas stream, namely 167°F.

The outlet gas $S_o$ from the scrubber unit is saturated at a temperature of 167°F. and has a particle concentration of about 0.03–0.04 gr./sdcf., which is lower than the inlet concentration by a factor of 10 times or more. Also, the concentration of sulfur oxides is reduced by about 80% by the alkaline scrubbing solution.

Examples 2 and 3 were run under similar test conditions with the results shown respectively in Tables 2 and 3 below.

EXAMPLE 2

100,000 acfm. of Kraft recovery boiler gas was fed to the nucleation unit. The gas at 300°F. dry bulb temperature and 170°F. wet bulb temperature contained particulates (particle size range 0.2 microns–1.1 micron) at a level of 0.20 gr./scf. and 50 ppm. TRS. The liquid recirculation rate in the scrubber was 5000 gpm. with 1000 gpm. recirculating through the humidifying venturi. The exhaust gas at 170°F. saturated has a particulate level of 0.012 gr./scf. The particle size cut point was 0.5 microns, and the system pressure drop was 12 inches water gauge.

TABLE 2

| | Gas Conditions | |
|---|---|---|
| | Inlet | Outlet |
| Gas Flow (acfm) | 100,000 | — |
| Temp. (°F.) | 300 | 170 |
| Dew Point (°F.) | 170 | 170 |
| Conc. $SO_x$[1] (ppm.) | — | — |
| Conc. Particulates (gr./scf.) | 0.20 | 0.012 |
| TRS (ppm.) | 50 | — |

[1]$SO_x$ is used to denote mixed sulfur oxides, predominantly $SO_2$.

Scrubbing Liquid[2]

| | Inlet | Outlet |
|---|---|---|
| Liquid Flow (gpm.) | 5000 | — |
| Temp. (°F.) | — | — |

[2]Scrubbing Liquid comprised 3 parts volume of 30% NaOH/44 parts water.
Venturi quench water — 1300 gpm. at 167°F.
Baffle wash water — 400 gpm.
Make-up scrubbing liquid — 47 gpm.
acfm — actual cubic feet per minute
ppm. — parts per million by volume
gr./scf. — grains per standard cubic foot
gpm. — gallons per minute
TRS — total reduced sulfur

EXAMPLE 3

250,000 acfm. of sulfate recovery boiler gas was fed to the nucleation unit. The gas entered at 280°F. with a 153°F. dew point. The particulates (particle size range 0.1–1.1 microns) was at a level of 0.309 gr./scf. at the inlet with 900 ppm. $SO_2$. The liquid recirculation rate was 120,00 gpm. with 2500 gpm. recirculating through the humidifying venturi. The exhaust gas at 153°F. saturated had a particulate level of 0.016 gr./scf. The particle size cut point was 0.47 microns, and the system pressure drop was 13 inches water gauge.

TABLE 3

| | Gas Conditions | |
|---|---|---|
| | Inlet | Outlet |
| Gas Flow (acfm) | 250,000 | — |
| Temp. (°F.) | 780 | 153 |
| Dew Point (°F.) | 153 | 153 |
| Conc. $SO_x$[1] (ppm.) | 900 | — |
| Conc. Particulates (gr./scf.) | 0.309 | 0.016 |
| TRS (ppm.) | — | — |

[1]$SO_x$ is used to denote mixed sulfur oxides, predominantly $SO_2$.

Scrubbing Liquid[2]

| | Inlet | Outlet |
|---|---|---|
| Liquid Flow (gpm.) | 12000 | — |
| Temp. (°F.) | — | — |

[2]Scrubbing Liquid comprised 3 parts volume of 30% NaOH/44 parts water.
Venturi quench water — 1300 gpm. at 167°F.
Baffle wash water — 400 gpm.
Make-up scrubbing liquid — 47 gpm.
acfm — actual cubic feet per minute
ppm. — parts per million by volume
gr./scf. — grains per standard cubic foot
gpm. — gallons per minute
TRS — total reduced sulfur

EXAMPLE 4

A test was run to compare the process characteristics of particulate removal carried out according to the present invention with those of the process according to U.S. Pat. No. 3,324,630. An apparatus with two scrubber units in series was employed. Run No. 1 represents a scrubbing process essentially according to the aforementioned patent. Run No. 2 and Run No. 3 represent scrubbing processes according to the present invention. It will be noted that in Run No. 3 almost complete adiabatic conditions have been attained with a constant scrubbing liquid temperature which is equal to the almost constant gas temperature inside the apparatus between the venturi and the scrubber. The results obtained are shown in Table 4 below.

TABLE 4

| Gas Conditions | Run No. 1 | Run No. 2 | Run No. 3 |
|---|---|---|---|
| Inlet Flow (acfm.) | 6062 | N.A. | N.A. |
| Outlet Flow (acfm.) | 3802 | 2669 | 3630 |
| Inlet Temp. (°F.) | 174 | 260 | 267 |
| Venturi Outlet (°F.) | no venturi | 161 | 158 |
| Final Outlet (°F.) | 60 | 155 | 157 |
| Liquid Conditions | | | |
| Venturi Quench (gpm.) | no venturi | 50 | 50 |
| Scrubber No. 1 | | | |
| Scrubbing Liquid (gpm.) | 75 | 140 | 140 |
| Inlet (°F.) | 57 | 155 | 157 |
| Outlet (°F.) | 110 | 155 | 157 |
| Scrubber No. 2 | | | |
| Scrubbing Liquid (gpm.) | 75 | 50 | 50 |
| Inlet (°F.) | 57 | 155 | 157 |
| Outlet (°F.) | 110 | 155 | 157 |

N.A. — Data not available
acfm. — actual cubic feet per minute
gpm. — gallons per minute Table 4 illustrates that whereas the process of U.S. Pat. No. 3,324,630 results in cooling the gas stream in the scrubber beds and heating the scrubbing liquid which must subsequently be cooled, the actual scrubbing process of the present invention is essentially adiabatic. Thus, in Run No. 1, the gas stream enters the scrubbing apparatus at 174°F. and, by contact with two streams of scrubbing liquid at 57°F., is cooled to 60°F. at the outlet. Correspondingly the two streams of scrubbing liquid are heated by contact with the gas to 110°F. Subsequently these streams must be cooled back to 57°F. before they can be recycled, and this cooling requires removing almost 4 million Btu per hour from the system. By contrast, in Runs No. 2 and 3 which were according to the process of the present invention, it is noted that there was no heating of the scrubbing liquids during contact with the gas stream since they had already been heated and did not require cooling before recirculation.

Having described my invention, what I claim is:

1. A process for treating an effluent gas containing entrained particulates a portion of which are below 1 micron in size and acid gas components, said gas having a temperature above 150°F., which comprises:
   a. initiating nucleation of the particulates in a first enclosure by treating the gas to increase its turbulence and to increase its humidity substantially to saturation at a temperature above about 150° to about 212°F. under substantially adiabatic conditions;
   b. passing said saturated gas which is at a temperature above about 150° to about 212°F. in a substantially horizontal path through a second enclosure containing packing;
   c. passing an aqueous scrubbing liquid downwardly over said packing;
   d. exhausting said gas from said second enclosure; and,
   e. collecting said liquid after passage through said packing and recirculating said liquid to said packing while maintaining it at a substantially constant temperature approximately the same as the saturated gas which is above about 150° to about 212°F.

2. The process of claim 1 additionally comprising the step of filtering said liquid after passage through said packing material to remove entrained particles therefrom.

3. The process of claim 1 wherein said hot gas is subjected to a preliminary particle removal step.

4. The process of claim 3 wherein said preliminary particle removal step comprises a cyclone separator.

5. The process of claim 1 wherein said turbulence is created by the use of a venturi.

6. The process of claim 5 wherein said quenching operation comprises a water spray at the inlet of said venturi.

7. The process of claim 1 wherein the turbulence is created by a set of baffles.

8. The process of claim 7 wherein said quenching operation comprises a water spray directed onto the face of said baffles.

9. The process of claim 1 wherein said turbulence is created by the use of both a venturi and a set of baffles, further wherein said quenching operation comprises both a water spray at said venturi inlet and a water spray directed onto the face of said baffles.

10. The process of claim 6 wherein subsequent to the quenching operation said gas is saturated at a temperature above 160° to about 212°F.

11. The process of claim 8 wherein subsequent to the quenching operation said gas is saturated at a temperature above 190° to about 212°F.

12. The process of claim 1 wherein said scrubbing liquid is water.

13. The process of claim 1 wherein said hot gas comprises acid gases and said scrubbing liquid comprises a 0.05–10% alkaline aqueous solution which effects at least a partial removal of said acid gases during the scrubbing process.

14. The process of claim 6 wherein said quenching operation comprises a spray of a 0.05–10% aqueous solution of a basic material at the inlet of said venturi.

15. The process of claim 8 wherein said quenching operation comprises a spray of a 0.05–10% aqueous solution of a basic material directed onto the face of said baffles.

16. The process of claim 1 wherein said packing material is a filamentous packing having little continuous extensive surface and having about 80–85% free volume, and consisting of randomly arranged, interlocked tower packing units, the units being made up of approximately circular, integrally connected filament portions having their axes approximately tangent to a circle at approximately evenly spaced points therearound, the number of such spaced approximately circular portions being from 6–12 and the diameter of such circle being approximately equal to the diameter of one of such approximately circular filament portions plus the diameter of a smaller circle whose circumference is not less than the cross-sectional dimension of the filament portion in the direction of its axis times the number of such filament portions and not greater than the circumference of one of such approximately circular filament portions.

* * * * *

UNITED STATES PATENT AND TRADEMARK OFFICE
CERTIFICATE OF CORRECTION

PATENT NO. : 3,957,464
DATED : May 18, 1976
INVENTOR(S) : Aaron J. Teller

It is certified that error appears in the above-identified patent and that said Letters Patent are hereby corrected as shown below:

```
Col. 1, line 58 - delete "a filamentous" and insert
                  therefor -- disclosed --.
Col. 3, line 12 - "lager" should be -- larger --.
Col. 3, line 36 - after "microns" insert -- is --.
Col. 4, line 46 - "quencn" should be -- quench --.
Col. 6, line 16 - "fist" should be -- first --.
Col. 7, line 23 - "0.2-1.1" should be -- 0.1-1.1 --.
Col. 7, line 44 - "oxide  s" should be -- oxides is --.
Col. 8, line 30 - "120,00" should be -- 120,000 --.
```

Signed and Sealed this

Twenty-eighth Day of September 1976

[SEAL]

Attest:

RUTH C. MASON
*Attesting Officer*

C. MARSHALL DANN
*Commissioner of Patents and Trademarks*